(No Model.) 2 Sheets—Sheet 2.
J. DRAKE.
COMBINATION CORN HARVESTER AND HUSKER.
No. 522,008. Patented June 26, 1894.
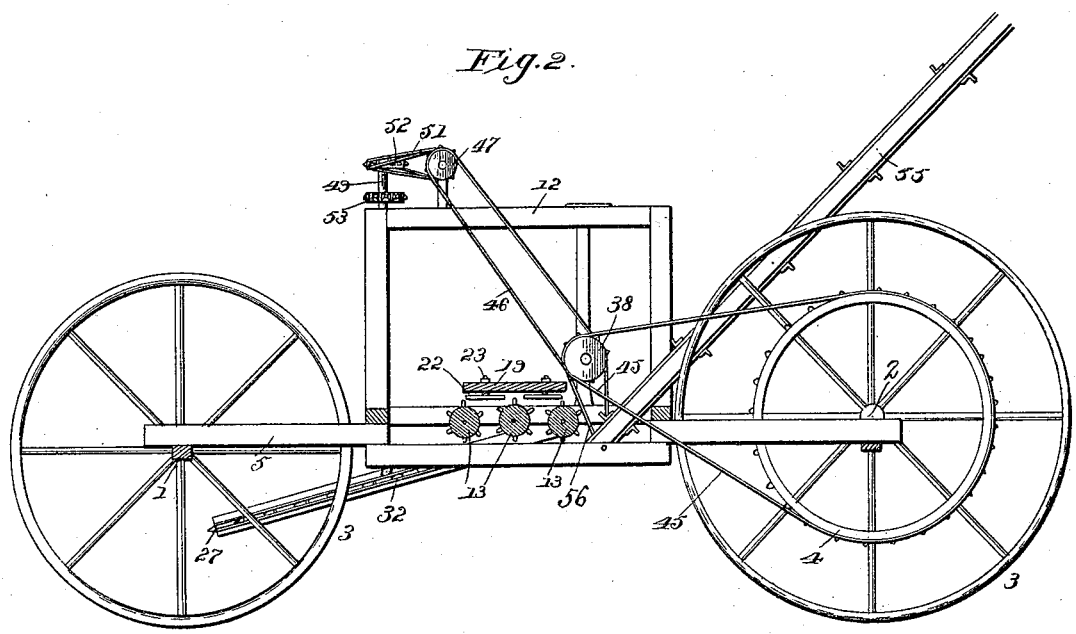
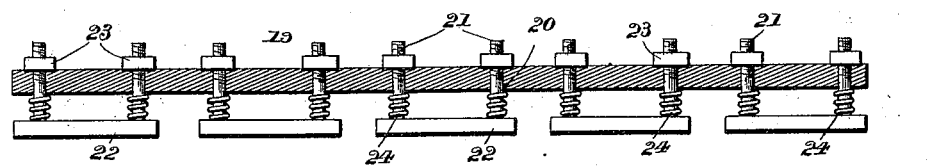
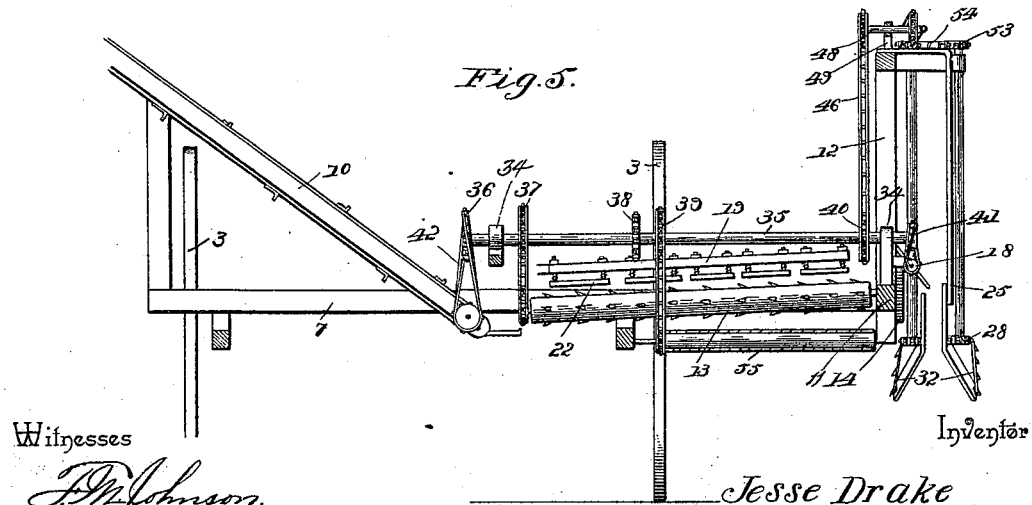
Witnesses
F. M. Johnson.
N. S. Duvall.
Inventor
Jesse Drake
By his Attorneys,
C. A. Snow & Co.
THE NATIONAL LITHOGRAPHING COMPANY,
WASHINGTON, D. C.

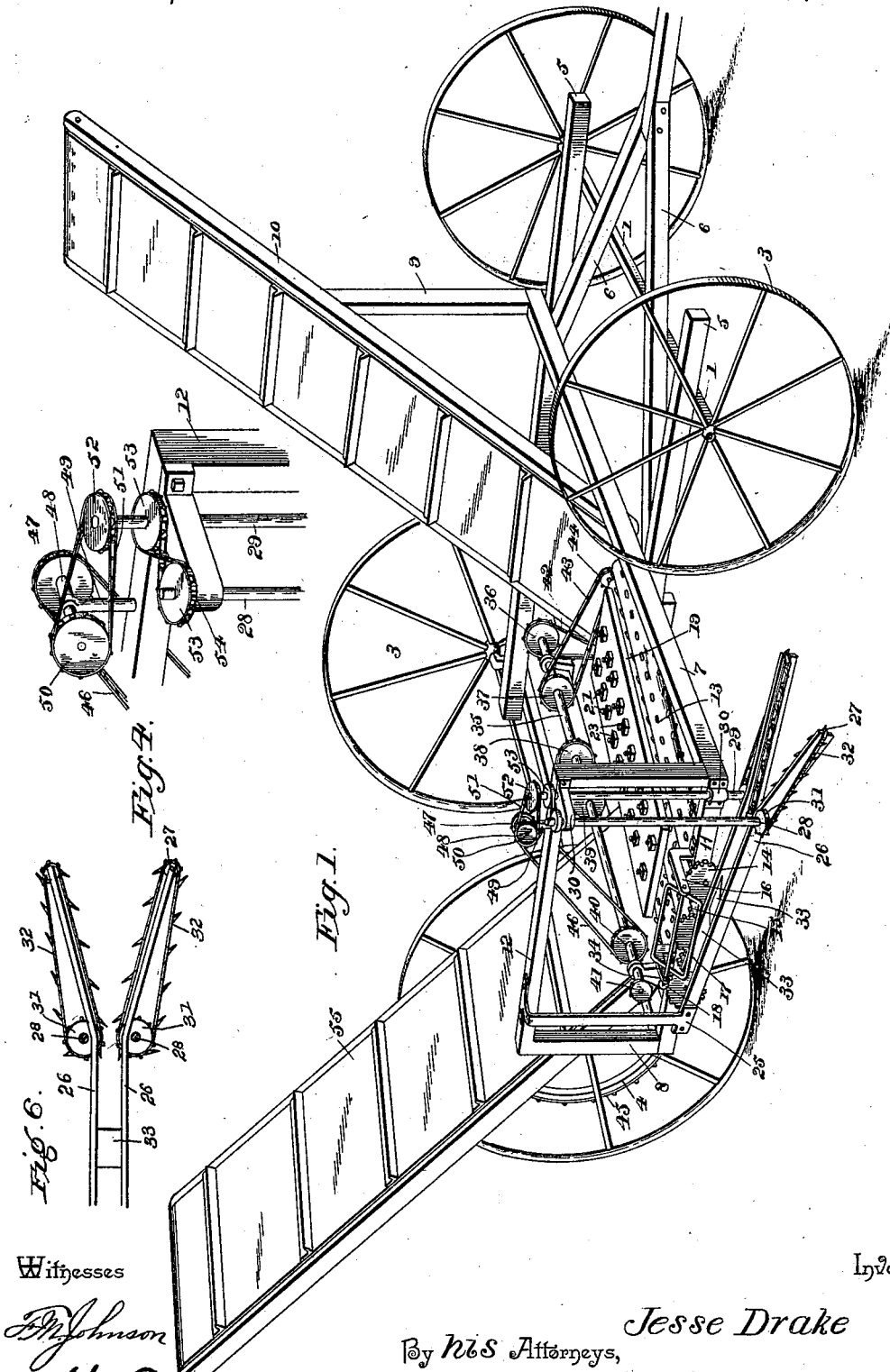

UNITED STATES PATENT OFFICE.

JESSE DRAKE, OF JACKSON, MISSISSIPPI.

COMBINATION CORN HARVESTER AND HUSKER.

SPECIFICATION forming part of Letters Patent No. 522,008, dated June 26, 1894.

Application filed March 31, 1893. Serial No. 468,463. (No model.)

*To all whom it may concern:*

Be it known that I, JESSE DRAKE, a citizen of the United States, residing at Jackson, in the county of Hinds and State of Mississippi, have invented a new and useful Combination Corn Harvester and Husker, of which the following is a specification.

My invention relates to improvements in that class of machines adapted to harvest and subsequently in one continuous operation husk corn; and the objects in view are to provide a machine of this class of cheap and simple construction adapted to engage the stalks of growing corn, raise the same, if depressed, and strip the corn-ears therefrom leaving the stalks thus stripped in the path of the machine, the corn being subsequently husked, the husks delivered over the rear end of the machine upon the ground, and the corn husked being conveniently delivered over the side of the machine into a wagon or other receptacle thereat.

With these and other objects in view the invention consists in certain features of construction hereinafter specified and particularly pointed out in the claims.

Referring to the drawings:—Figure 1 is a perspective view of a machine constructed in accordance with my invention. Fig. 2 is a vertical longitudinal sectional view of the machine. Fig. 3 is a longitudinal sectional view of the presser-board and its pressers for retaining the ears of corn in position to be operated upon by the husking-rollers. Fig. 4 is an enlarged detail of the system of gears and chains at the upper ends of the gathering-shafts 28 and 29. Fig. 5 is a transverse sectional view looking toward the front of the machine. Fig. 6 is a plan view in detail of the gathering-arms and stripping-plate.

Like numerals of reference indicate like parts in all the figures of the drawings.

In the present instance, 1 designates the front axle, and 2 the rear axle, said axles having the ground-wheels 3 rotatably mounted on the ends thereof, and one of the rear wheels carrying a master sprocket-wheel 4, which, in a manner hereinafter described, transmits motion to the various parts of the machine. A pair of beams or side-bars 5, support the axles, and a draft-device 6 extends beyond the beams and the front axle. Supported by the beams 5 is a pair of transverse bars 7, the same being parallel to each other and provided at their ends with vertical standards 8 and 9, the former being at the right of the machine, and the latter at the left and supporting an inclined carrier-frame 10 located at that side of the machine. The ends of the bars 7 are connected by cross-bars 11, and the standards 8 are connected by an upper cross-bar 12. In the inner bar 5 and cross-bar 11 bearings are formed, and in these are journaled the axles of a series of three rolls 13. These rolls are arranged parallel to each other and adjacent and have their peripheries covered with inclined teeth. The rolls are inclined, their lowest ends being at the inner side of the machine, and having their shafts beyond the cross-bar 11 provided with spur-gears 14 which are engaged by intermediate smaller gears 15 mounted upon stub-shafts extending from the bar 11.

At the outer ends of the rolls 13, which are the husking-rolls, there is mounted upon the bar 11 a pair of inverted L-shaped standards 16, and in these is journaled a revolving reel 17, having at one end a small sprocket-wheel 18.

Supported above the rolls 13 is a board 19, the same being best shown in Fig. 3 of the drawings. This board is provided at intervals with pairs of perforations 20, each pair being occupied by the bolts 21 that extend upward from pressing-blocks or plates 22. The upper ends of the bolts, above the board, are provided with set-nuts 23, and coiled-springs 24 are interposed between the under side of the board and the upper sides of the blocks or plates 22, so that they are normally pressed downward by their springs, the tensions of which may be increased or diminished through the medium of the nuts 23. By means of these blocks or plates the ears of corn are pressed upon the rolls so that the teeth of the latter act to tear the husks therefrom.

Supported by a depending standard 25 secured to the bar 12 at one side of the framework and by the end bar 11 is a pair of parallel gathering-arms 26, the front portions of which are diverged and provided at their ends with small sprocket-wheels 27. Shafts 28 and 29 are mounted in bearings 30 at each side of the gathering-arms, which latter arms, it will be seen, are flared toward their outer ends. The shafts are provided at their lower ends with sprocket-wheels 31, and independent sprocket-chains 32 having supports pass around the small sprocket-wheels 27 and the sprocket-wheel 31, and receiving motion from their respective shafts serve to draw in the stalks of corn as they become engaged by the said gathering-arms.

Between the gathering-arms at their parallel portions I locate a dull knife or stripping-plate 33, so that as the stalks are gathered by the diverging arms they are successively and singly fed into the narrow throat formed by the parallel portions of the gathering-arms, and becoming bent by the pressure thereagainst of the knife are stripped of their ears. As the machine moves along, said ears are squeezed, and at the same time in a manner cut, from the stalks, after which they are by means of the reel thrown upon the husking-rolls where the operation of husking is carried on. It will be understood that this knife is not sharp, and therefore does not engage with or cut the stalk, but combines with the sides of the gathering-arms to force or strip the ears from the stalks.

In a pair of standards 34 there is journaled a countershaft 35 transversely disposed, said shaft carrying a series of sprocket-wheels 36, 37, 38, 39, 40 and 41. The first mentioned sprocket-wheel 36 is connected by means of a sprocket-chain 42 to the roll of the carrier 10, whereby said carrier is given motion. The second sprocket-wheel 37 is, by means of a belt 43, connected with a small sprocket-wheel 44 upon the inner end of one of the rolls 13, whereby motion is imparted to all the rolls in a manner heretofore described. The third sprocket-wheel 38 is, by means of a drive-chain 45, given motion from the master sprocket 4, whereby the countershaft is driven. The sprocket-wheel 40 by means of a chain 46 drives a small sprocket-wheel 47, which is mounted upon a shaft 48 that is seated upon a short vertical standard 49. This shaft 48 carries a companion sprocket-wheel 50, and through the medium of a chain 51 drives a sprocket-wheel 52 on the upper end of the shaft 29. The shaft 29 and the shaft 28 carry small sprocket-wheels 53, and the two are driven through the medium of a cross-belt 54. This completes the construction of the machine, with the exception of a rear inclined carrier 55, which is driven through the medium of a sprocket-chain 56 carried by the sprocket-wheel 39. A cross-belt 57 conveys motion from the small sprocket 41 to the wheel 18 of the reel.

The operation of the device will for the most part be understood from the foregoing description, or at least the manner of conveying motion to and from the various parts will be understood.

In operation the corn, as before stated, is stripped from the stalks and knocked by the reel back upon the inclined set of husking-rolls, being pressed into engagement therewith by the presser-blocks or plates, which it will be understood, will yield so as to operate upon both large and small ears of corn. The husks are here stripped, and passing down through the rolls are caught by the elevator or carrier 55 and deposited at the rear end of the machine, whereas the corn continuing down the rolls is caught by the carrier 10 and dropped over the end of the same into a wagon, which may be driven alongside of the machine, or into any other receptacle for this purpose.

It will be seen that the machine consists of few parts, is cheaply and simply constructed, and is calculated to carry on the operation in a positive and accurate manner.

I do not limit my invention to the details of construction herein shown and described, but hold that I may vary the same to any extent within the knowledge of the skilled mechanic.

Having described my invention, what I claim is—

1. In a machine of the class described, the combination with the framework, and gathering-devices, of a series of inclined husking-rolls, a board arranged thereover and provided with a series of pairs of perforations, a series of presser-blocks or plates, bolts rising therefrom and passing through the perforations, nuts for the bolts, and coiled springs interposed between the plates and boards and mounted on the bolts, substantially as specified.

2. In a machine of the class described, the combination with the framework, the divergent gathering-arms, the shafts 28 and 29 at the inner ends thereof, sprocket-wheels on the lower ends of the shafts and at the outer ends of the arms, sprocket-wheels at the upper ends of the shafts, cross-belts for the same, and feed-belts for the lower sprocket-wheels and those of the arms, a sprocket-wheel on the upper end of the inner shaft 29, a short transverse shaft, sprocket-wheels thereon, a belt connecting one of said wheels with the upper sprocket of the shaft 29, a countershaft, a series of sprocket-wheels carried thereby, a chain connecting one of the same with one of the twin sprocket-wheels of the short shaft, a driving-gear, a chain connecting the same with one of the series of sprocket-wheels of the countershaft, a rear and side elevator, chains leading from the sprocket-wheels of the countershaft to the rolls of the elevator, a gathering reel arranged over the gathering-arms, a sprocket-wheel on the shaft, a chain between the same and a sprocket-wheel of the countershaft, and a knife carried by the gathering-arms, of a series of husking-rollers in rear of the reel, gears on the ends of the rollers communicating motion to each other, one of said rollers having a sprocket-wheel, and a chain connecting the latter with one of the sprocket-wheels of the countershaft, substantially as specified.

In testimony that I claim the foregoing as my own I have hereto affixed my signature in the presence of two witnesses.

JESSE DRAKE.

Witnesses:
P. C. RATTIFF,
C. L. GASTON.